(12) United States Patent
Morse

(10) Patent No.: US 6,888,541 B2
(45) Date of Patent: May 3, 2005

(54) REAL TIME THREE DIMENSIONAL FACTORY PROCESS MONITORING AND CONTROL

(75) Inventor: Carl P. Morse, Milford, NH (US)

(73) Assignee: Schneider Automation Inc., North Andover, MA (US)

(*) Notice: Subject to any disclaimer, the term of this patent is extended or adjusted under 35 U.S.C. 154(b) by 269 days.

(21) Appl. No.: 10/082,760

(22) Filed: Feb. 25, 2002

(65) Prior Publication Data

US 2003/0160778 A1 Aug. 28, 2003

(51) Int. Cl.$^7$ .............................................. G06T 17/00
(52) U.S. Cl. ....................... 345/419; 345/757; 345/771; 345/772; 345/965
(58) Field of Search ................................. 345/419, 473, 345/474, 475, 757, 764, 771, 772, 848, 849, 850, 851, 852, 965, 966, 970; 700/28, 83, 96, 110, 121; 434/72; 710/15, 73; 701/207; 340/539.1, 825

(56) References Cited

U.S. PATENT DOCUMENTS 6,167,464 A * 12/2000 Kretschmann ................ 710/15
6,282,455 B1 * 8/2001 Engdahl ....................... 700/83

* cited by examiner

Primary Examiner—Almis R. Jankus

(57) ABSTRACT

A method for monitoring a factory process is disclosed. The factory process comprises a plurality of tasks. The method comprises displaying the factory process in real-time as a three-dimensional, free-camera, computer generated representation of the process as a whole, selectively displaying each of the tasks in real-time as a three-dimensional, free-camera, computer generated representation of the respective task.

18 Claims, 5 Drawing Sheets

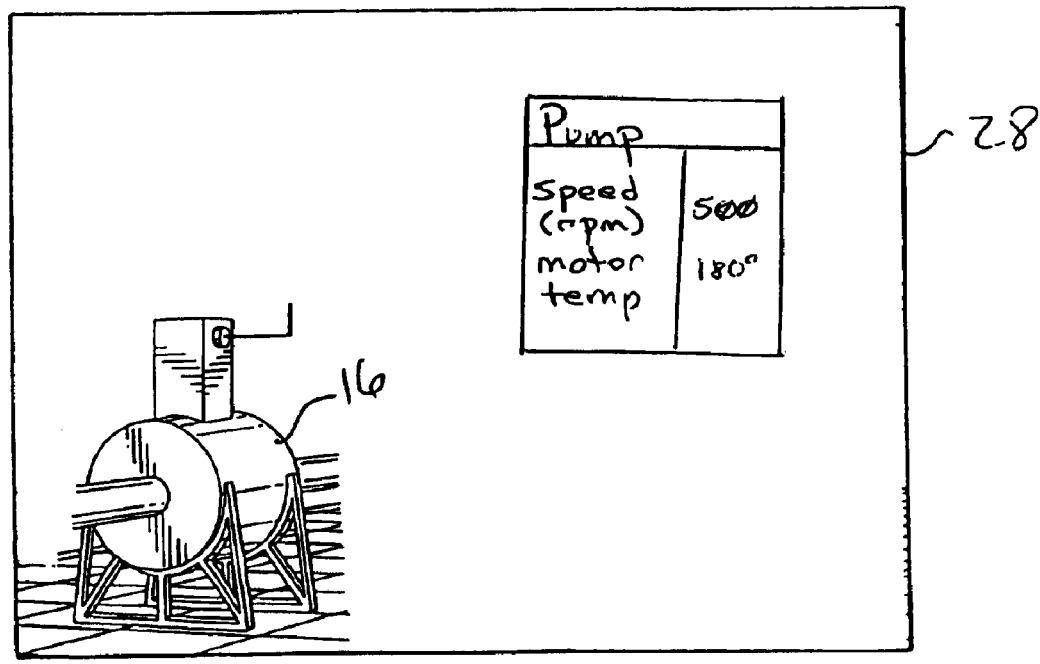

REAL TIME THREE DIMENSIONAL FACTORY PROCESS MONITORING AND CONTROL

CROSS-REFERENCE TO RELATED APPLICATIONS

None.

FEDERALLY SPONSORED RESEARCH OR DEVELOPMENT

None.

TECHNICAL FIELD

This invention relates to a method and apparatus for displaying a process, such as a factory process, to permit monitoring and controlling of the process.

BACKGROUND OF THE INVENTION

A manufacturing process typically includes a plurality of coordinated tasks or operations, and each of the tasks or operations typically includes a plurality of sub-tasks or sub-operations.

One way to monitor and control the process is for an operator or operators to be physically present at each of the tasks and sub-tasks of the process, so that the operator or operators can both view each of the tasks and sub-tasks, as well as control them. Depending upon the size and complexity of the process, this can be difficult and labor intensive.

Another way to monitor and control the process is to have cameras positioned at various locations along the process, and to have monitors coupled to the cameras, and located near some form of remote process control. However, this can be a problem, as typically the cameras are fixed, and thus it can be difficult to view certain portions of the process without an unlimited number of cameras.

A still other way to monitor and control the process is with a traditional two-dimensional representation of the process, including its tasks and sub-tasks, displayed on a graphic monitor. However such representation typically does not provide the operator with a true visual understanding of the operation of the process.

The invention is provided to solve these and other problems.

SUMMARY OF THE INVENTION

It is an object of the invention to provide a method to permit monitoring of a factory process, the factory process comprising a plurality of tasks.

In accordance with the invention, the method comprises displaying the factory process in real-time as a three-dimensional, free-camera, computer generated representation of the process as a whole and selectively displaying each of the tasks in real-time as a three-dimensional, free-camera, computer generated representation of the respective task.

It is contemplated that the method includes selectively displaying data representative of a status of the displayed process.

It is further contemplated that the method includes selectively displaying data representative of a status of one or more of the displayed tasks.

It is still further contemplated that the process has a controllable parameter and the method includes controlling the parameter of the factory process.

It is further contemplated that the method includes sensing a status of one of the tasks, determining if the sensed status is acceptable, and automatically displaying the task if the sensed status is not acceptable.

It is still further contemplated that the method includes sensing a status of a plurality of the tasks, determining if the sensed status of each of the plurality of tasks is acceptable, and automatically displaying one of the plurality of tasks if the sensed status of the one of the plurality of tasks is determined not to be acceptable.

It is a further object of the invention to provide a system for monitoring a factory process, the factory process comprising a plurality of tasks.

In accordance with the invention, the system comprises means for displaying the factory process in real-time as a three-dimensional, free-camera, computer generated representation of the process as a whole and means for selectively displaying each of the tasks in real-time as a three-dimensional, free-camera, computer generated representation of the respective task.

It is contemplated that the system includes means for selectively displaying data representative of a status of the displayed process.

It is further contemplated that the system includes means for selectively displaying data representative of a status of one or more of the displayed tasks.

It is still further contemplated that the process has a controllable parameter and the system includes means for controlling the parameter of the factory process.

It is further contemplated that the system includes means for sensing a status of one of the tasks, determining if the sensed status is acceptable, and automatically displaying the task if the sensed status is not acceptable.

It is still further contemplated that the system includes means for sensing a status of a plurality of the tasks, determining if the sensed status of each of the plurality of tasks is acceptable, and automatically displaying one of the plurality of tasks if the sensed status of the one is determined not to be acceptable.

It is yet another object of the invention to provide a computer readable medium containing program instructions for execution by a processor to cause the processor to perform steps to permit monitoring of a process on a video display. The process comprises a plurality of tasks.

In accordance with this aspect of the invention, the steps comprise displaying the factory process in real-time as a three-dimensional, free-camera, computer generated representation of the process as a whole and selectively displaying each of the tasks in real-time as a three-dimensional, free-camera, computer generated representation of the respective task.

It is contemplated that the steps further include selectively displaying data representative of a status of the displayed process.

It is further contemplated that the process has a controllable parameter and the steps include controlling the parameter of the factory process.

It is still further contemplated that the steps include sensing a status of one of the tasks, determining if the sensed status is acceptable and automatically displaying the task if the sensed status is not acceptable.

These and other aspects and attributes of the present invention will be discussed with reference to the following drawings and accompanying specification.

BRIEF DESCRIPTION OF THE DRAWINGS

FIG. 6 is a three-dimensional, computer generated, representation of the task of FIG. 4, including a graphic display of the status of the task of FIG. 4.

DETAILED DESCRIPTION OF THE INVENTION

Figure 1:
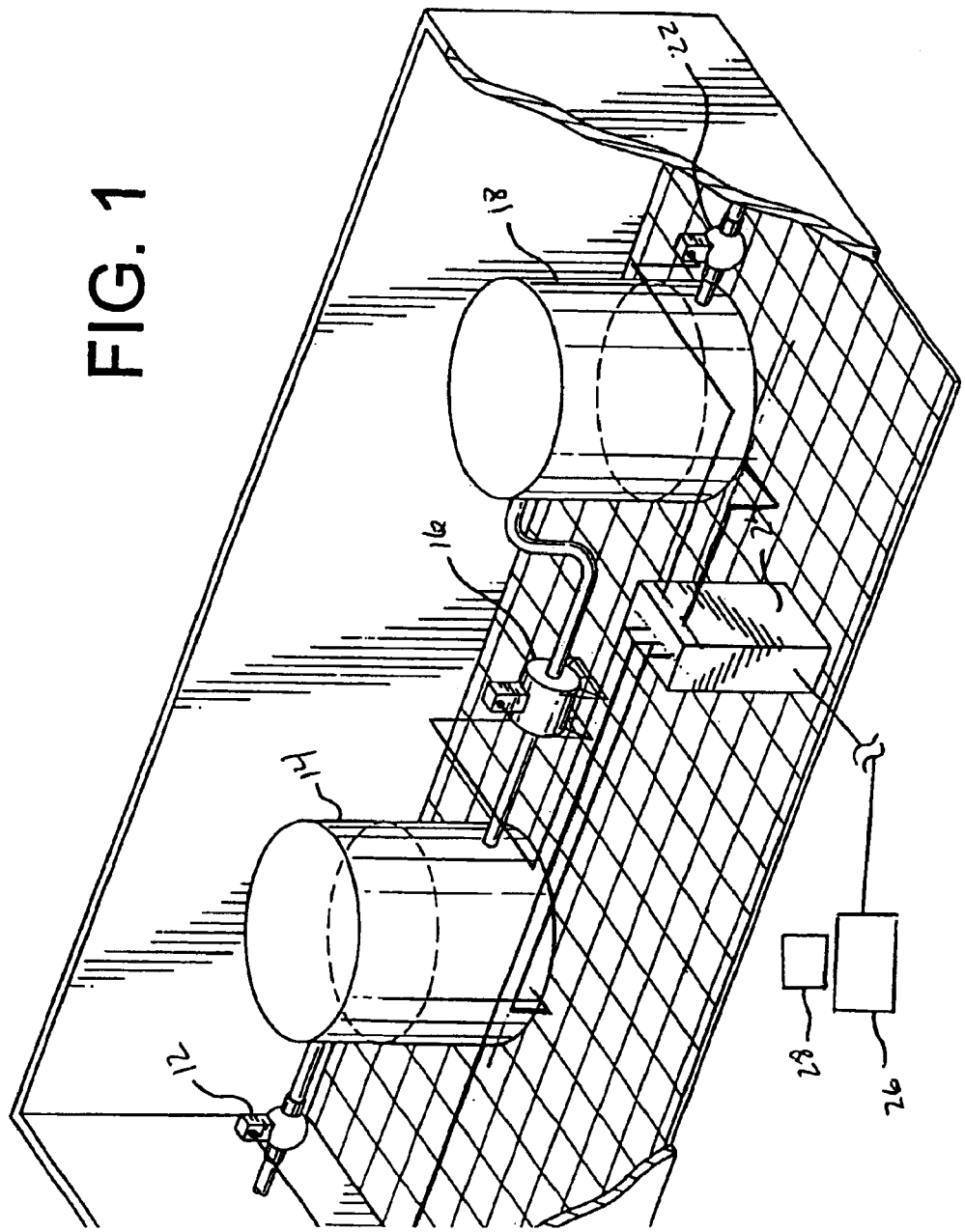
FIG. 1 is a perspective view of a process, including a plurality of tasks.

While this invention is susceptible of embodiment in many different forms, there is shown in the drawing, and will be described herein in detail, a specific embodiment thereof, with the understanding that the present disclosure is to be considered as an exemplification of the principles of the invention and is not intended to limit the invention to the specific embodiment illustrated.

A factory process 10 comprising a plurality of tasks is illustrated In FIG. 1. The process includes a plurality of tasks, including a first motor operated valve 12, a first settling tank 14, a motorized pump 16, a second settling tank 18, and a second motor operated valve 22. Each of the tasks is coupled to a control box 24, which is coupled to a remote computer 26 and monitor 28. The factory process and each of the tasks include controllable parameters. For example, the speed of the motorized pump 16 can be controlled.

A system is provided to permit monitoring and control of the process 10. Referring to FIGS. 2–6, a computer generated virtual image of the factory process 10 is generated by the computer 26 and displayed on the monitor 28 in real-time as a three-dimensional, free-camera, computer generated representation of the process 10 as a whole, or of selected portions of the process 10. The virtual image can be created using Microsoft Corporation=s DirectX7 suite of application programming interfaces and Windows7 software.

Figure 2:
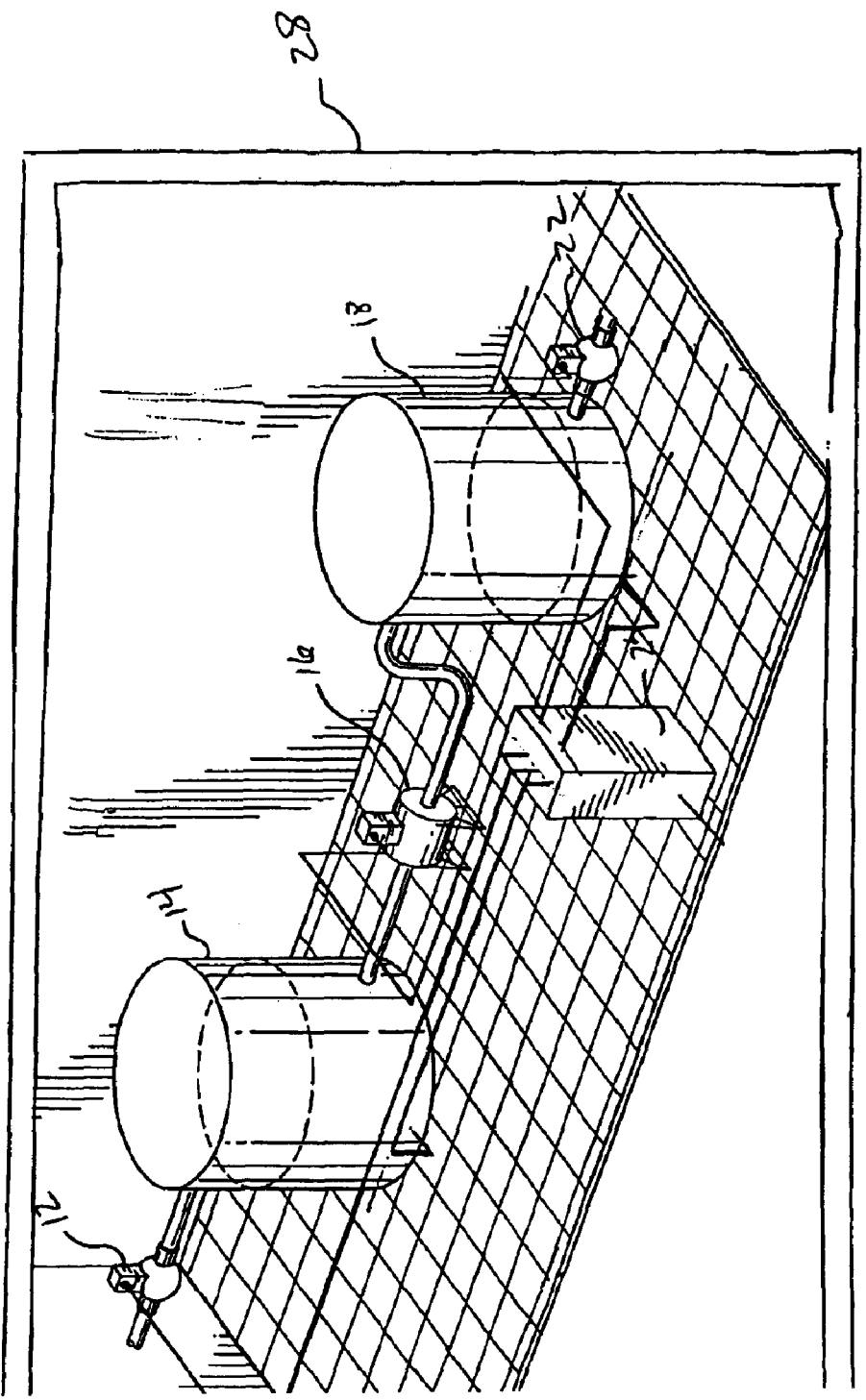
FIG. 2 is a three-dimensional, computer generated, representation of the process of FIG. 1.

FIG. 2 shows a three-dimensional, free-camera, computer generated, virtual representation of the process 10 as a whole from one orientation, as viewed from the monitor 28.

Figure 3:
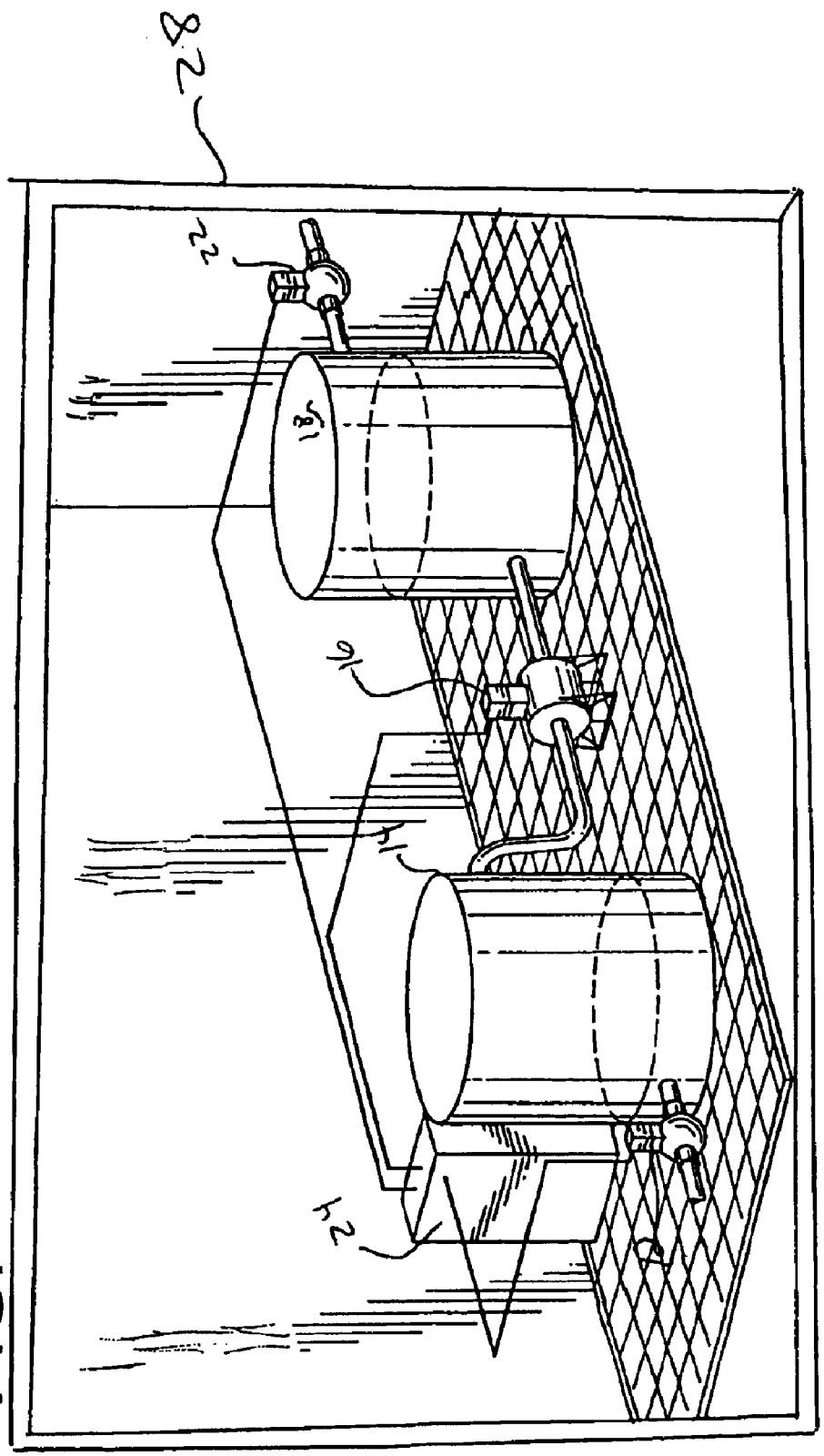
FIG. 3 is a three-dimensional, computer generated, representation of the process illustrated in of FIG. 2, but from a different orientation.

FIG. 3 shows a three-dimensional, free-camera, computer generated representation of the process 10 as a whole from another orientation. The selection of the view is under the control of the computer 26. The Afree camera@ aspect permits an operator at the monitor 28 to view the process from a virtual camera which can be virtually moved to effectively every position and orientation about the process, including permitting the operator to visually zoom in and zoom out.

The system further permits the monitor 28 to selectively display data representative of a status of the displayed process. For example, a flow sensor (not shown) can be placed in a pipe connecting the first and second tanks 14, 18, and the monitor 28 can display the rate of flow between the tanks 14, 18.

The system further permits selective control of the factory process parameter. For example, the motor operated valve 12 can be selectively opened and closed by the operator via the computer 26.

Figure 4:
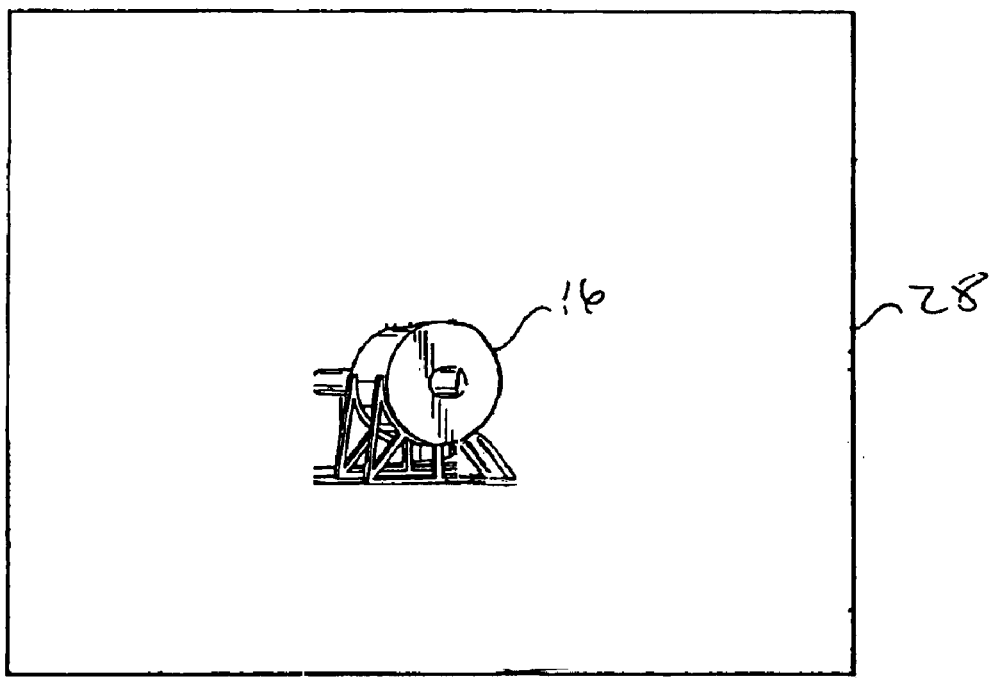
FIG. 4 is a three-dimensional, computer generated e of one of the tasks of FIG. 1.
Figure 5:
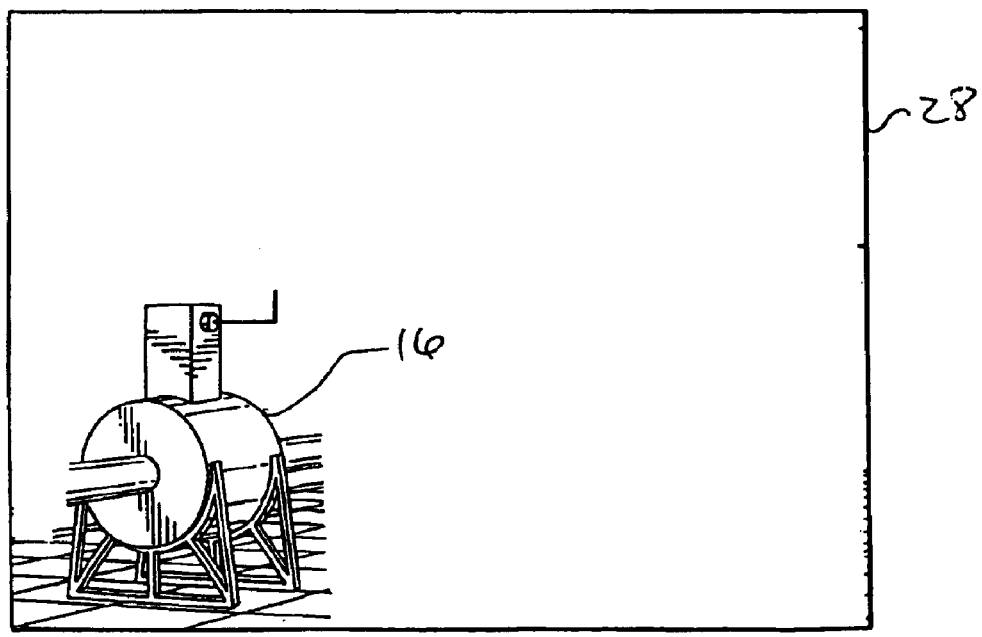
FIG. 5 is a three-dimensional, computer generated, representation of the task of FIG. 4, but from a different orientation.

The system further permits selectively displaying each of the individual tasks in real-time as a three-dimensional, free-camera, computer generated representation of the respective task. This permits one to more closely view what is occurring with respect to each individual task. For example, one can select virtual display of only the motorized pump 16, as shown in FIG. 4. If the motorized pump 16 is running, a three-dimensional representation of the pump 16 running is displayed. As displayed in FIG. 5, like the display of the process 10 as a whole, the Afree camera@ aspect permits the operator at the monitor 28 to view the virtual image of the motorized pump 16, or any other sub task, from effectively every orientation, including permitting the operator to visually zoom in and out.

The system still further permits selective displaying of data representative of a status of the displayed task. For example, as shown in FIG. 6, the monitor will display the speed of the motorized pump 16, as well as other information.

Still further, the system permits the operator to selectively control the controllable parameter of each of the tasks. For example, the system permits the operator to turn the motorized pump 16 on and off, via the computer 26.

Each of the tasks can be broken down into sub-tasks, which similarly can be displayed, monitored and controlled. For example, the motorized pump 16 can be separately displayed as a motor and a pump (not shown). Depending on the complexity of a >task=, there can be multiple layers of sub-tasks, sub-sub-tasks, and the like. This permits the operator to virtually monitor and control a process at various levels of detail.

The system senses a status of one of the tasks, determines if the sensed status is acceptable and automatically displays the virtual image of the task if the sensed status is not acceptable. For example, the system can sense the speed of the motor of the motorized pump 16, and compare the sensed speed with an acceptable speed. If the speed of the pump 16 is not within an acceptable range, a virtual image of the pump will be displayed, calling the operator=s attention to the problem.

The control and display operates under the control of a computer readable medium containing program instructions for execution by a processor in the computer to cause the processor to perform steps.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. For a factory process comprising a plurality of tasks, a method to permit monitoring and controlling of the factory process, the method comprising:

displaying the factory process in real-time as a three-dimensional, free-camera, computer generated representation of the process as a whole; and selectively displaying each of the tasks in real-time as a three-dimensional, free-camera, computer generated representation of the respective task, wherein at least one of the tasks for the factory process has a controllable parameter and the method includes changing the controllable parameter of the task to affect control in the factory process.

2. The method of claim 1 including selectively displaying data representative of a status of the displayed process.

3. The method of claim 1 including selectively displaying data representative of a status of one of the displayed tasks.

4. The method of claim 1 including selectively displaying data representative of a status a plurality of the displayed tasks.

5. For a factory process comprising a plurality of tasks, a method to permit monitoring of the process, the method comprising:
    displaying the factory process in real-time as a three-dimensional, free-camera, computer generated representation of the process as a whole;
    selectively displaying each of the tasks in real-time as a three-dimensional, free-camera, computer-generated representation of the respective task;
    sensing a status of one of the tasks;
    determining if the sensed status is acceptable; and
    automatically displaying the task if the sensed status is not acceptable.

6. For a factory process comprising a plurality of tasks, a method to permit monitoring of the process, the method comprising:
    displaying the factory process in real-time as a three-dimensional, free-camera, computer generated representation of the process as a whole;
    selectively displaying each of the tasks in real-time as a three-dimensional, free-camera, computer-generated representation of the respective task;
    sensing a status of a plurality of the tasks;
    determining if the sensed status of each of the plurality of tasks is acceptable; and
    automatically displaying one of the plurality of tasks if the sensed status of the one of the plurality of tasks is determined not to be acceptable.

7. For a factory process comprising a plurality of tasks, a method to permit monitoring and controlling of the factory process, the method comprising:
    displaying the factory process in real-time as a three-dimensional, free-camera, computer generated representation of the process as a whole;
    selecting one of the tasks; and wherein the selected task is a controllable parameter that can be changed to selectively affect control of the factory process.

8. The method of claim 7 including displaying data representative of a status of a plurality of the displayed tasks.

9. For a factory process comprising a plurality of tasks, a computer readable medium containing program instructions for execution by a processor to cause the processor to perform steps to permit monitoring and controlling of the factory process on a video display, the method comprising:
    displaying the factory process in real-time as a three-dimensional, free-camera, computer generated representation of the process as a whole; and
    selectively displaying each of the tasks in real-time as a three-dimensional, free-camera, computer generated representation of the respective task wherein at lest one of the tasks for the factory process has a controllable parameter and the method includes changing the controllable parameter of the task to affect control in the factory process.

10. The method of claim 9 including selectively displaying data representative of a status of the displayed process.

11. The method of claim 9 including selectively displaying data representative of a status of one of the displayed tasks.

12. The method of claim 9 including selectively displaying data representative of a status a plurality of the displayed tasks.

13. For a factory process comprising a plurality of tasks, a computer readable medium containing program instructions for execution by a processor to cause the processor to perform steps to permit monitoring of the process on a video display, the method comprising:
    displaying the factory process in real-time as a three-dimensional, free-camera, computer generated representation of the process as a whole;
    selectively displaying each of the tasks in real-time as a three-dimensional, free-camera, a computer generated representation of the respective task;
    sensing a status of one of the tasks;
    determining if the sensed status is acceptable; and
    automatically displaying the task if the sensed status is not acceptable.

14. For a factory process comprising a plurality of tasks, a computer readable medium containing program instructions for execution by a processor to cause the processor to perform steps to permit monitoring of the process on a video display, the method comprising:
    displaying the factory process in real-time as a three-dimensional, free-camera, computer generated representation of the process as a whole;
    selectively displaying each of the tasks in real-time as a three-dimensional, free-camera, a computer generated representation of the respective task;
    sensing a status of a plurality of the tasks;
    determining if the sensed status of each of the plurality of tasks is acceptable; and
    automatically displaying one of the plurality of tasks if the sensed status is determined not to be acceptable.

15. A system for monitoring a factory process, the factory process comprising a plurality of tasks, a system comprising:
    means for displaying the factory process in real-time as a three-dimensional, free-camera, computer generated representation of the process as a whole;
    means for selectively displaying each of the tasks in real-time as a three-dimensional, free-camera, computer-generated representation of the respective task;
    means for sensing a status of a plurality of the tasks;
    means for determining if the sensed status of each of the plurality of tasks is acceptable; and
    means for automatically displaying the task if the sensed status is not acceptable.

16. A system for monitoring a factory process, the factory process comprising a plurality of tasks, a system comprising:
    means for displaying the factory process in real-time as a three-dimensional, free-camera, computer generated representation of the process as a whole;
    means for selectively displaying each of the tasks in real-time as a three-dimensional, free-camera, computer generated representation of the respective task;
    means for sensing a status of a plurality of the tasks;
    means for determining if the sensed status of each of the plurality of tasks is acceptable; and
    means for automatically displaying one of the plurality of tasks if the sensed status of the one is determined not to be acceptable.

17. For a factory process comprising a plurality of tasks, wherein both the factory process and the tasks include controllable parameters, a method to permit monitoring and control of the process, the method comprising:

- displaying the factory process in real-time as a three-dimensional, free-camera, computer generated representation of the process as a whole;
- selectively displaying data representative of a status of the displayed process;
- selectively controlling the factory process parameter;
- selectively displaying each of the tasks in real-time as a three-dimensional, free-camera, computer generated representation of the respective tasks;
- selectively displaying data representative of a status of a plurality of the displayed tasks;
- selectively controlling the controllable parameter of the each of the tasks;
- sensing a status of one of the tasks;
- determining if the sensed status is acceptable; and
- automatically displaying the task if the sensed status is not acceptable.

18. For a factory process comprising a plurality of tasks, wherein both the factory process and the tasks include controllable parameters, a method to permit monitoring and control of the process, the method comprising:

- displaying the factory process in real-time as a three-dimensional, free-camera, computer generated representation of the process as a whole;
- selectively displaying data representative of a status of the displayed process;
- selectively controlling the factory process parameter;
- selectively displaying each of the tasks in real-time as a three-dimensional, free-camera, computer generated representation of the respective tasks;
- selectively displaying data representative of a status of a plurality of the displayed tasks;
- selectively controlling the controllable parameter of the each of the tasks;
- sensing a status of one of the tasks;
- determining if the sensed status of each of the plurality of tasks is acceptable; and
- automatically displaying one of the plurality of tasks if the sensed status of the one is determined not to be acceptable.

* * * * *